No. 617,665. Patented Jan. 10, 1899.
E. P. WATERHOUSE.
TOY.
(Application filed May 15, 1897. Renewed Mar. 25, 1898.)
(No Model.)

Attest:
John Williams
J. W. Shepherd.

Inventor:
E. P. Waterhouse,
by Carr & Carr, attys.

United States Patent Office.

EDWARD P. WATERHOUSE, OF ST. LOUIS, MISSOURI.

TOY.

SPECIFICATION forming part of Letters Patent No. 617,665, dated January 10, 1899.

Application filed May 15, 1897. Renewed March 25, 1898. Serial No. 675,195. (No model.)

*To all whom it may concern:*

Be it known that I, EDWARD P. WATERHOUSE, a citizen of the United States, residing in the city of St. Louis and State of Missouri, have invented a new and useful Toy, of which the following is a specification.

My invention relates to toys, and has for its object to make a device capable of moving in such an irregular and paradoxical manner as to produce an interesting amusement.

It consists mainly in a hollow ball having inside thereof a rotatable fly-wheel mounted on a free axle.

It also consists in the details of construction hereinafter described and claimed.

Figure 1:
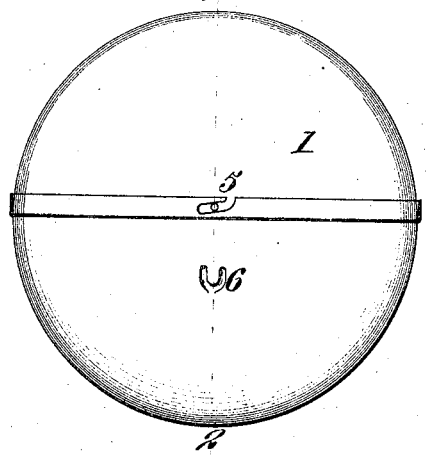
Figure 2:
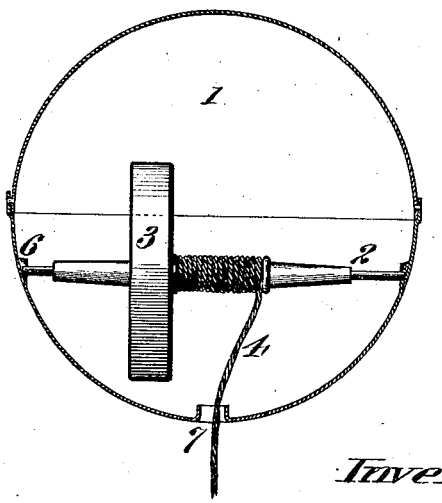

In the accompanying drawings, which form part of this specification, Figure 1 is an exterior view of my device. Fig. 2 is a section thereof on the line 2 2 of Fig. 1.

The body of my device is a hollow ball 1, made of any suitable material. Inside of this ball is an axle or spindle 2, whose length is less than the interior diameter of the ball. Mounted on this spindle is a fly-wheel 3, which is fixed, preferably, closer to one end of the spindle than to the other end and is of a radius short enough to keep the wheel from touching the ball. In order that the rolling or sliding contact of the rotating spindle may produce a progressive movement, the bearing ends of the spindle are made of an appreciable diameter instead of tapering to a point. Obviously divers means may be used for setting the fly-wheel in motion. In the device shown the wheel is arranged to be spun by means of a cord or string 4, wound around an enlarged hub on the wheel or the spindle. This construction necessitates the making of the ball in two sections in order to get access to the hub for winding; but the device can be made so as to obviate such necessity by arranging to have the fly-wheel manipulated from the outside of the ball. The two sections are detachably fastened by any convenient means—as, for instance, by the pin-and-slot connection 5.

In the construction shown shallow U-shaped or open-top bearings 6 are formed in the interior of the ball for one or both ends of the spindle, and a hole 7 is formed in the ball or shell near the middle of the arc subtended by the spindle when its ends are in such bearings. As the ends of the spindle shift around, an annular boss should be formed around the hole to prevent the spindle from protruding.

The operation of the device is as follows: The sections of the ball are separated and the spindle and fly-wheel are removed therefrom and the cord wound around the enlarged hub of said wheel or spindle. The end or ends of said spindle is or are inserted in the shallow bearing or bearings, as the case may be, provided therefor on the interior of the ball, with the free end of the string extending through the hole 7. The sections are then fastened together, and while the ball is held in one hand the cord is pulled quickly with the other hand to set the fly-wheel rapidly rotating. The ball is then let loose on the floor or elsewhere and runs around at very irregular speeds and in very irregular directions.

I contemplate using the device above described as a motor mechanism for divers toy animals, the frame which represents the animal being built around such ball in such a manner as to leave the ball in contact with the floor.

What I claim is—

1. A toy comprising a hollow ball, a spindle therein shorter than the interior diameter of the ball and whose ends rest loosely on the inner surface of said ball and a fly-wheel fixed on said spindle, substantially as and for the purpose set forth.

2. A toy comprising a hollow ball, a free spindle therein shorter than the interior diameter of the ball, a fly-wheel on said spindle nearer to one end thereof than to the other end, and means for rotating said spindle, substantially as and for the purpose set forth.

3. A toy comprising a hollow sectional ball, having an open-top spindle-bearing on the inner surface thereof, a spindle therein shorter than the interior diameter of the ball, and a fly-wheel mounted on said spindle, said ball having a hole for the passage of a string wound around said spindle, substantially as and for the purpose set forth.

EDWARD P. WATERHOUSE.

Witnesses:
HARRY C. AGNEW,
E. V. HARMAN.